United States Patent Office 3,043,142
Patented July 10, 1962

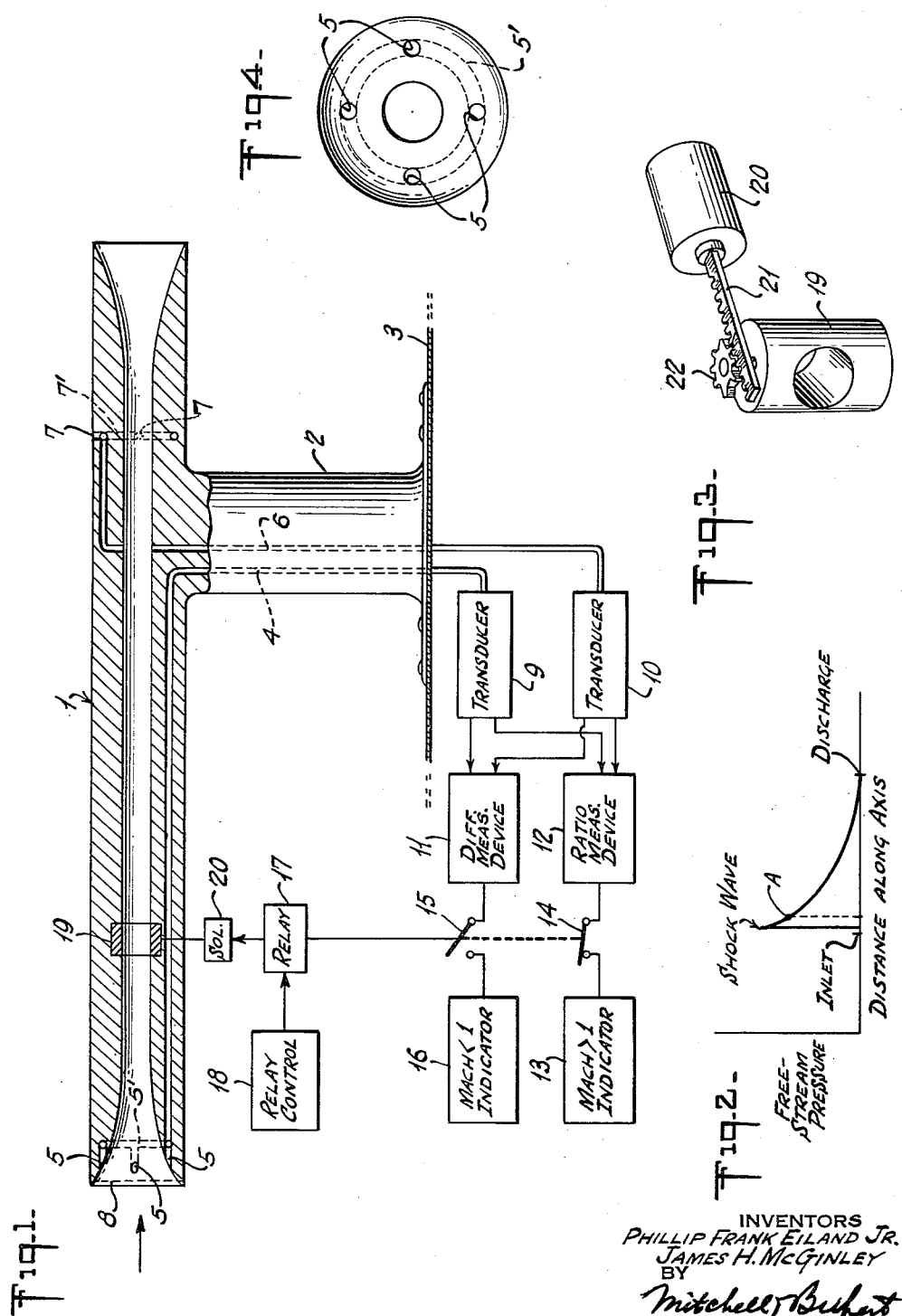

3,043,142
DEVICE FOR MEASURING SUPERSONIC AND SUBSONIC SPEEDS
Phillip Frank Eiland, Jr., and James H. McGinley, State College, Pa., assignors, by mesne assignments, to HRB-Singer, Inc., State College, Pa., a corporation of Delaware
Filed Sept. 23, 1958, Ser. No. 762,723
13 Claims. (Cl. 73—212)

This invention relates to a speed measuring device adapted to be attached to a vehicle, and more particularly to such a device capable of measuring supersonic and subsonic speeds.

Pitot tubes for measuring fluid velocities are, of course, well known in the art. The Pitot tube, for measuring subsonic fluid velocities, is a relatively simple device, comprising a pair of tubular members, one for measuring the static or ambient pressure and the other for measuring the dynamic pressure. The velocity of the fluid is determined by the difference between the static and dynamic pressures in accordance with the relation $$V = \sqrt{\frac{2(P_s - P_o)}{\rho}}$$

where $P_s$=total pressure, $P_o$=static pressure, and $\rho$ is the density of the fluid. However, at supersonic speeds, i.e., Mach numbers greater than 1, the conventional Pitot tube is not suitable for several reasons. For example, the square law relation between dynamic pressure and velocity no longer applies. Further, the shock wave will not attach to the dynamic pressure probe, with resultant uncertainty as to the extent of spillover. As a result, considerable difficulty has been encountered in devising an instrument for measuring Mach number at supersonic speeds.

Accordingly, it is an object of this invention to provide a "Pitot" tube which is capable of measuring Mach number at supersonic speeds.

It is a further object of this invention to provide a "Pitot" tube capable of measuring Mach number at supersonic speeds over a relatively wide range of Mach numbers.

Although the supersonic Mach number measuring device is technically not a Pitot tube, its structure resembles that of a Pitot tube and will, for simplicity, be referred to as such.

In accordance with an aspect of the invention, there is provided a device for measuring fluid or aircraft Mach numbers at which a normal shock wave may be generated. The device comprises a tubular member adapted to be positioned in a freestream, in alignment with the flow or flight direction. The invention, in a preferred form, is characterized by locating a port of a first pressure measuring tube closely behind the normal shock wave, and a port of a second pressure measuring tube on the surface of the tubular member for measuring freestream or static pressure. The two pressures are applied to apparatus for measuring their ratio, whereby the Mach-number of the fluid or aircraft may be determined.

In accordance with another aspect of the invention, the single Pitot tube is capable of measuring both supersonic Mach numbers and subsonic speeds. This aspect of the invention is characterized by selectively opening and closing the opening through the tubular member.

The above-mentioned and other features and objects of this invention and the manner of attaining them will become apparent and the invention itself will be best understood by reference to the following description of an embodiment of the invention taken in conjunction with the accompanying drawing, wherein:

FIGURE 1 is a longitudinal sectional view of the Pitot tube and the associated circuitry for measuring Mach number or speed;

FIGURE 2 is a curve of pressure as a function of distance along the axis of the Pitot tube and showing the relationship between freestream pressure and shock wave pressure, as utilized in the operation of our device;

FIGURE 3 is a perspective view of an air-cock and actuating mechanism for controlling the flow of air through the Pitot tube; and FIGURE 4 is a front view of the tube showing a plurality of ports.

The invention utilizes the principle that the pressure closely behind a normal shock wave is related to the freestream Mach number by the equation:

$$M = \sqrt{\frac{6\left(\frac{P_1}{P_\infty}\right) + 1}{7}}$$

where $P_1$ is the pressure closely behind the normal shock wave and $P_\infty$ is the freestream pressure. By normal shock wave is meant a wave having a front normal to the axis of the tube and is to be distinguished from an oblique shock wave which forms an acute angle with the axis of the tube.

The Pitot tube of the invention comprises an openended tubular member 1 and an arm or strut 2 for mounting or securing the Pitot tube to a side 3 of an aircraft (not shown). In the illustration, the strut is shown riveted to the side of the aircraft. The inlet and discharge openings of the tubular member 1 are suitably convergent and divergent, respectively, joining an elongated restrictive passage or duct.

The Pitot tube comprises a dynamic pressure measuring tube 4 having a port 5 positioned within and near the inlet of the tubular member 1, and a static or ambient pressure measuring tube 6, having a port 7 exposed on the external surface of the tubular member 1.

In accordance with the primary object of the invention, that is measuring Mach numbers at supersonic speeds, the inlet of the tubular member 1 is designed to generate the normal shock wave at or just within the inlet. The normal shock wave is a function of the particular convergent profile at the inlet of the tube. This shape may be determined theoretically or experimentally, and when suitably designed, the normal shock wave will be subjected to little or no axial displacement as a function of increasing Mach number, over a relatively wide range of Mach numbers; the axial location of the ports 5 is preferably such as to be behind all possible normal shock waves, for such wide range of Mach numbers.

The shock wave is shown symbolically at 8, at the inlet of the Pitot tube 1. A typical shock wave pressure curve is shown in FIGURE 2. The pressure recovery following the shock wave extends from the point of generation at the inlet of the tube to approximately the discharge opening at the rear of the tube.

In order to determine the Mach number of the craft, the port 5 is located closely behind the peak of the shock wave, for example at a position corresponding to A in FIGURE 2. In practice, the port 5 may be positioned anywhere along the slope of the shock wave curve. However, for optimum results, and since the pressure decay is exponential in nature, it is advisable to locate the port as closely as is practicable to the peak of the curve.

The pressure in the tube 4 and the freestream pressure in the tube 6 are applied to pressure transducers 9 and 10, respectively. Suitable transducers for converting pressure to electrical energy are well known in the art. For example, analog computers generally used in aircraft comprise such transducers for determining flight characteristics such as pressure, speed, etc.

Depending on the speed of the craft, i.e., supersonic or subsonic, the electrical energy from the transducers is applied either to a difference measuring device 11 or to a ratio measuring device 12. As indicated by the equation for Mach number, in order to determine Mach number at supersonic speeds, the ratio of $P_1$ (pressure behind the shock wave) to $P_\infty$ (freestream pressure) must be known. Continuing, therefore, with the assumed example of supersonic flight, the electrical energy is applied to the ratio measuring device 12. The output from the device 12 is then applied to a "Mach greater than 1" indicator 13 which is preferably calibrated to give a direct reading indication.

As shown, the ratio measurement is applied over closed switch contacts 14. The contacts 14 are ganged with contacts 15 which are connected to the lead between the difference measuring device 11 and indicator 16 for "Mach less than 1." The contacts 14, 15 are preferably contacts of a relay 17 under manual or automatic control 18. The control 18 comprises a relay power supply and a switch preferably located in the pilot's compartment for manual operation.

In accordance with a second aspect of the invention, the Pitot tube may alternatively be used to measure subsonic speeds by closing the opening through the tube.

The opening through the tube may be closed by an air-cock 19 shown in detail in FIGURE 3. The air-cock is rotatably mounted about its axis in bearing sockets formed in the tube 1. The operation of the air-cock may be controlled by a solenoid 20 driving a gear rack 21 coupled to a pinion 22; the pinion 22 being fixedly attached to one end of the air-cock 19. The air-cock is rotated 90° to either open or close the opening through the tube.

As shown in FIGURE 1, the solenoid is controlled jointly with the contacts 14 and 15, by the relay 17.

Thus, if the craft is travelling at subsonic speeds, the pilot operates the relay control 18 accordingly. The relay control energizes the relay to operate the solenoid 20, which closes the opening through the tube, and also reverses the shown position of the contacts 14 and 15. The circuit for the ratio measuring device 12 is thus opened and the circuit for the difference measuring device 11 is closed. The speed of the craft appears on the indicator 16 for Mach less than 1.

The fluid mechanics of the Pitot tube for Mach less than 1 is conventional. The pressure in the tube 4 is the total or dynamic pressure and the pressure in the tube 6 is the static pressure.

The several advantages of the novel Pitot tube should now be apparent. It serves the dual purpose of measuring supersonic Mach numbers and subsonic speeds. Further, because the tube is open-ended, dirt particles in the air can pass directly through the tube without clogging the pressure ports.

As shown in FIGURES 1 and 4, the dynamic-pressure and static-pressure ports 5 and 7 are preferably provided in angularly spaced pluralities and are manifolded at 5' and 7' in their respective connections to pressure lines 4 and 6. The plurality of ports is preferred because the shock wave is a scattered, random wave and it is desirable to obtain an average pressure at a plurality of points spaced a uniform distance from the inlet of the tube; also, with the arrangement shown, yaw and pitch of tube 1 with respect to the flight axis have the least possible degrading effect.

Although not so described in detail, it will be understood that either the measuring devices 11, 12 or the indicators 13, 16 may be suitably designed and calibrated for true direct-reading indications of Mach number.

Although the tube has been described as a device for measuring the Mach number or speed of a vehicle, it may also be used to measure the velocity of a fluid stream, e.g., in a wind tunnel.

While the foregoing description sets forth the principles of the invention in connection with specific apparatus, it is to be clearly understood that this description is made only by way of example and not as a limitation of the scope of the invention as set forth in the objects thereof and in the accompanying claims.

We claim:

1. A device for measuring Mach number at speeds at which a normal shock wave is generated, comprising an open-ended tubular member adapted to be positioned in a free stream, said tubular member being adapted to produce a fixed normal shock wave therewithin at supersonic speed of said free stream, a first pressure sensing element terminating in the interior of said tubular member closely behind the normal shock wave, and a second pressure sensing element terminating on the exterior of said tubular member for measuring the free stream pressure, whereby the pressures sensed by said first and second pressure sensing elements can be used to produce an indication of Mach number.

2. A device for measuring subsonic speeds, and Mach number at supersonic speeds at which a normal shock wave is generated, comprising an open-ended tubular member adapted to be positioned in a free stream, said tubular member being adapted to produce a fixed normal shock wave therewithin at supersonic speeds of said free stream, a first pressure measuring tube having a port located in the interior of the tubular member closely behind the normal shock wave, a second pressure measuring tube having a port located on the surface of said tubular member for measuring the free stream pressure, whereby the pressures in said first and second tubes can be used to produce an indication of supersonic Mach number, and means located behind the port of said first tube for selectively closing the opening through said tubular member, whereby when said tubular member is closed the pressures in said tubes can be used to produce an indication of the subsonic speed.

3. A Pitot tube for measuring Mach number at supersonic speeds, comprising an open-ended tubular member adapted to be positioned in a free stream, means for generating a fixed normal shock wave at the inlet of said tubular member, a first pressure measuring tube having a port mounted closely behind said normal shock wave, and a free stream pressure measuring tube having a port mounted on the surface of said tubular member, whereby the pressures in said tubes can be used to produce an indication of the supersonic Mach number.

4. The Pitot tube according to claim 3, and further comprising means located behind the port of said first pressure measuring tube for closing the opening through said tubular member, whereby subsonic speeds may be determined by measuring the difference between the pressures in said tubes.

5. A Pitot tube for measuring supersonic Mach numbers and subsonic speeds, comprising an open-ended tubular member adapted to be positioned in a free stream, means for generating a fixed normal shock wave at the inlet of said tubular member, a pressure measuring tube having a port mounted closely behind said normal shock wave, a free stream pressure measuring tube having a port mounted on the surface of said tubular member, a pair of transducers connected respectively to said pressure measuring tubes for converting air pressure into electrical energy, a difference measuring device connected to the outputs of said transducers, a subsonic speed indicator switchably connected to said difference measuring device, a ratio measuring device connected to the outputs of said transducers, a supersonic Mach number indicating device switchably connected to said ratio measuring device, and means located behind the port of said first pressure measuring tube for selectively closing the opening through said tubular member, whereby when the tubular member is open supersonic Mach numbers may be measured and when said tubular member is closed subsonic speeds may be measured.

6. The tube according to claim 5, wherein said means for closing said tubular member comprises a cylindrical air-cock rotatably mounted inside said tubular member and having a coaxial opening conforming to the opening of said tubular member, and solenoid means for rotating said air-cock through an angle of 90 degrees so that the axis of the opening is perpendicular to the axis of said tubular member.

7. The tube according to claim 6, and further comprising a relay for jointly controlling said solenoid and the switchable connections between said Mach number and speed indicators and said measuring devices respectively.

8. A Pitot tube for measuring Mach number in accordance with the formula $$M = \sqrt[7]{\frac{6\left(\frac{P_1}{P_\infty}\right)+1}{7}}$$

where M is the Mach number, $P_1$ is the pressure closely behind the peak of a normal shock wave and $P_\infty$ is the free stream pressure of a supersonic air stream, said Pitot tube comprising an open-ended tubular member adapted to be positioned in a supersonic air stream, the mouth of the tubular member being shaped to generate a fixed normal shock wave, a pressure measuring tube having a port opening closely behind said normal shock wave, and a free stream pressure measuring tube having a port opening on the surface of said tubular member, whereby the Mach number may be determined in accordance with said formula.

9. A device for measuring Mach number at speeds at which a normal shock wave is generated, said device comprising an open-ended tubular member adapted to be positioned in a free stream, the inlet of said tubular member being shaped to generate a normal shock wave at a predetermined inlet location, therein, a first pressure measuring device located in the interior of said tubular member closely behind said predetermined inlet location therein, and a second pressure measuring device located on the surface of said tubular member for measuring the free stream pressure, whereby the ratio of the pressures in said first and second pressure measuring devices can be used to produce an indication of Mach number.

10. A Mach number measuring device comprising a tubular pressure probe member containing an open inlet end, an open outlet end, an inner surface, and an outer surface; support means for attaching said pressure probe member to a reference structure adapted to be exposed to a stream of compressible fluid moving at supersonic speed relative thereto, said support means being adapted to hold said pressure probe member in contact with said fluid stream and in axial alignment with the velocity vector thereof; the inlet end of said pressure probe member being shaped in such manner as to generate a normal shock wave in said fluid stream within said pressure probe member at a predetermined location near the inlet end thereof; a first pressure sensing element terminating on the inner surface of said pressure probe member slightly downstream from said predetermined location; said first pressure sensing element being adapted to sense the pressure of said shock wave; a second pressure sensing element terminating on the outer surface of said pressure probe member, said second pressure sensing element being adapted to sense the static pressure of said fluid stream; and means for combining the pressures sensed by said two pressure sensing elements in accordance with a predetermined functional relationship to produce an indication of Mach number.

11. The combination defined in claim 10 wherein said predetermined functional relationship is defined by the equation $$M = \sqrt[7]{\frac{6\left(\frac{P_1}{P_\infty}\right)+1}{7}}$$

where M is Mach number, $P_1$ is the pressure of the normal shock wave, and $P_\infty$ is the static pressure of the fluid stream.

12. The combination defined in claim 10 wherein said support means comprises a streamlined strut attached at one end to said pressure probe member and adapted to be attached at the other end to said reference structure; and wherein said first pressure sensing element comprises a first fluid conduit communicating through said strut to the inlet end of said pressure probe member, said first fluid conduit being open at one end thereof, the open end being located on the inner surface of said pressure probe member slightly downstream from said predetermined location, and wherein said second fluid pressure sensing element comprises a second fluid conduit communicating through said strut to the outer surface of said pressure probe member, said second fluid conduit being open at one end thereof, the open end being located on the outer surface of said pressure probe member, and wherein said combining means comprises a first pressure transducer coupled to the other end of said first conduit, a second pressure transducer coupled to the other end of said second conduit, and a computer circuit coupled to said first and second pressure transducers.

13. The combination defined in claim 12 wherein the open end of said first fluid conduit is directed longitudinally with respect to said pressure probe member and wherein the open end of said second fluid conduit is directed radially with respect thereto.

References Cited in the file of this patent

UNITED STATES PATENTS

| 2,101,858 | Knisley | Dec. 14, 1937 |
| 2,706,407 | Hosford | Apr. 19, 1955 |
| 2,869,367 | Moore | Jan. 20, 1959 |
| 2,895,333 | Hazen | July 21, 1959 |

FOREIGN PATENTS

| 561,087 | Great Britain | May 4, 1944 |

OTHER REFERENCES

Ser. No. 297,878, Baroni (A.P.C.), published May 4, 1943 (abandoned).